United States Patent Office 2,780,664
Patented Feb. 5, 1957

2,780,664

HYDROCARBON DRYING OIL

George E. Serniuk, Roselle, N. J., assignor to Esso Research and Engineering Company, a corporation of Delaware No Drawing. Application October 16, 1952,
Serial No. 315,190

6 Claims. (Cl. 260—683.15)

This invention relates to a method for preparing drying oils and relates, more particularly, to the preparation of drying oils by the copolymerization of diolefins and mono-olefins.

Copolymers of butadiene and isobutylene have been known for some time. Butadiene and isobutylene have been copolymerized at various temperatures with various catalysts. It is known that the polymerization of varying ratios of butadiene and isobutylene at below $-100°$ C. by means of solubilized Friedel-Crafts catalysts results in a rubbery polymer of low butadiene content and low unsaturation. Such a polymer is not suitable for use as a surface coating agent in the sense that natural drying oils can be used because such polymers are not capable of forming firm films with the chemical and mechanical resistances desired in a surface coating agent. When 1,3-butadiene and isobutylene are copolymerized in a ratio of 40 parts to 60 parts in a haloalkane diluent at about $-15°$ C. using a solubilized Friedel-Crafts catalyst, rubber-like, soft, light colored polymers of low unsaturation are obtained, thin films of which dry very slowly. The chemical and mechanical properties of such films are not satisfactory. Under the same conditions, polymerization of feeds consisting of 40 to 75 parts of butadiene and 25 to 60 parts of isobutylene results in somewhat softer polymers of intermediate unsaturation. These polymers give films which dry slowly. The water, grease, caustic and soap resistances of such films are poor. Thus, by effecting the copolymerization of mixtures comprising varying ratios of butadiene and isobutylene, at varying temperatures, by means of a solubilized AlCl$_3$ catalyst, resinous to rubbery or rubber-like, soft polymers are produced which are not outstanding as surface coating agents.

It has now been found that oily-type copolymers of conjugated dienes and olefins, which have excellent drying properties, can be prepared by controlling the ratio of diolefin to olefin and by employing special catalysts. In accordance with this invention, the reactants may consist of at least 75 parts of a conjugated diolefin and about 25 parts of an olefin. The components to be copolymerized are dissolved in a haloalkane diluent of 1 to 3 carbon atoms and contacted with a boron fluoride complex catalyst in the presence or absence of certain activators at temperatures ranging from about $-30°$ C. to $+100°$ C. under atmospheric or superatmospheric pressure.

Suitable conjugated diene hydrocarbons include 1,3-butadiene, 2-methyl-1,3-butadiene, 2-chloro-1,3-butadiene, 2,3-dimethyl-1,3-butadiene, 2-methyl-pentadiene, cyclopentadiene, methylcyclopentadiene, etc.

Suitable mono-olefins include ethylene, propylene, 1- and 2-butylene, isobutylene, isomeric amylenes, cyclohexene and substituted cyclohexenes, cyclopentene and substituted cyclopentenes, terpenes such as camphene, etc.

Preferred diluents include lower alkyl halides of 1 to 3 carbon atoms such as methyl chloride, ethyl chloride, tetrachloroethane, tetrachloroethylene, or haloalkanes containing mixed halogens. Other diluents such as chlorinated aromatics, etc., may also be used.

The amount of diluent required is governed, to a large extent, by the reactivity of the diene and olefin system used. The amount of diluent, based on the total volume of hydrocarbon reactants, may be varied between 5 to 250 volume percent, preferably 25 to 125 volume percent.

Of particular importance in carrying the present invention into effect is the ratio of diolefin to olefin in the feed. For highly reactive drying oils the conjugated diene should comprise from 75%–100% of the feed mixture and the olefin from 0–25%. Furthermore, the feed in this ratio is preferably polymerized by means of a specific type of catalyst. This catalyst is a coordination compound of a Friedel-Crafts type catalyst and an ether which may be used in conjunction with certain activators. While any of the Friedel-Crafts catalysts such as aluminum chloride, aluminum bromide, zirconium tetrachloride, stannic tetrachloride can be used, it is particularly desirable to use boron trifluoride since this compound when complexed with the ether gives higher yields and a better drying oil. Suitable ethers include ethyl ether, beta,beta-dichloro ethyl ether, methyl phenyl ether, ethyl phenyl ether, and diphenyl ether, etc. Suitable activators include ethyl bromide, carbon tetrachloride, bromo-trichloromethane, chloroform, formic acid, oxalic acid, sulfuric acid, phosphoric acid, hydrogen fluoride, primary, secondary or tertiary alkyl fluorides; small amounts of ethyl alcohol or water. These activators may be used in amounts ranging from 0.1 to 10 weight percent based on the hydrocarbon feed.

The amount of catalyst is dependent upon the reactivity of the hydrocarbon feed and upon the temperature of the reaction. Catalyst concentrations in the order of 0.5 to 50 weight percent, based on the hydrocarbon feed, may be used. A preferred range is 5 to 25 weight percent, based on the hydrocarbons.

When the proper ratios of monomers are used in conjunction with the complex catalyst, or activated complex catalyst, products are obtained which have superior film forming properties. When cast as a film on tin plate, the oily products of the present invention show drying times of 6 to 24 hours and remarkably high resistances to chemicals and mechanical action. However, when less of the diolefin is used, the products are not suitable as surface coating agents because the products are not capable of forming firm films with the chemical and mechanical resistances necessary for commercial acceptance. Furthermore, because of the low degree of unsaturation of such polymers, they react less readily with natural drying oils to form varnishes.

The process according to the present invention affords the following advantages:

1. The reaction system is homogeneous.
2. An essentially complete conversion of the charge is obtained under mild conditions of temperature and pressure. This would indicate that essentially no preferential polymerization of a single component occurs.
3. The catalyst can be readily activated.
4. Such a catalyst can be used directly on a highly concentrated olefinic feed without producing gel polymer.
5. The polymers produced by the catalyst of this invention are oily and non-resinous in nature, and show approximately 75% of the theoretical amount of unsaturation.
6. After removing the diluents such a catalyst can be removed by gravitation or distillation and reused without any apparent loss of activity.

The catalysts of this invention do not lose activity readily, can be distilled without decomposition and can be recovered and reused. They produce polymers having higher unsaturation than comparable polymers produced by means of boron fluoride-water complexes; they can be activated to give rapid polymerization and are decidedly less corrosive than boron fluoride-water complexes.

The following examples illustrate the advantages to be secured in accordance with the present invention:

EXAMPLE 1

Butadiene was copolymerized in the following manner with various mono-olefins:

A 5-liter 3-way flask fitted with a mechanical stirrer, Dry Ice cooled reflux condenser, catalyst delivery funnel and a thermometer was charged with the following:

| | | |
|---|---|---|
| Methyl chloride | cc | 770 |
| 1,3-butadiene | g | 750 |
| Olefin | g | 250 |

To the above was then added boron trifluoride-ethyl ether complex (Bakers Code 1471-Technical). A volume of 50 cc. of the catalyst corresponded to 55.6 g. The catalyst was delivered in 50 cc. increments over varying periods of time. Generally, a total of 350 to 450 cc. of catalyst was delivered. The reaction temperature averaged $-15°$ C. After about 1 to 6 hours the catalyst was quenched with 100 cc. of methanol and 200 cc. of ammonium hydroxide. The quenched system was allowed to stand over night to weather off methyl chloride. On the following day, the oily product was decanted from the salts. The salt was washed with naphtha and washings combined with the main product. The salt was dissolved in a minimum amount of water and the hydrocarbon which separated was segregated from the water layer and combined with the product. The main product was treated with Attapulgus fines, allowed to stand for several hours and then filtered. The polymer was isolated by stripping out solvents under high vacuum.

The data are reported in the following table:

*Table I.—Butadiene-olefin polymers*

| Run No | 1 | 2 | 3 | 4 | 5 | 6 | 7 | 8 | 9 |
|---|---|---|---|---|---|---|---|---|---|
| Feed Composition: | | | | | | | | | |
| Butadiene, g | 750 | 750 | 750 | 750 | 750 | 750 | 1,000 | 750 | 750. |
| Isobutylene, g | 250 | GES 10-6-52 | | | | | | | |
| Propylene, g | | 250 | | | | | | | |
| 1-Butene, g | | | 250 | | | | | | |
| 2-Butene, g | | | | 250 | | | | | |
| Cyclohexene, g | | | | | 250 | | | | |
| Diisobutylene, g | | | | | | 250 | | | |
| Styrene, g | | | | | | | | 250 | 250. |
| Ratio Diene/Olefin | 75/25 | 75/25 | 75/25 | 75/25 | 75/25 | 75/25 | 100/0 | 75/25 | 75/25. |
| Diluent: | | | | | | | | | |
| Type | MeCl | MeCl | MeCl | MeCl | MeCl | MeCl | MeCl | MeCl | MeCl. |
| Volume, ml | 770 | 770 | 770 | 770 | 770 | 770 | 785 | 770 | 385. |
| Catalyst: | | | | | | | | | |
| Type | $Et_2OBF_3$ | $Et_2OBF_3$ | $Et_2OBF_3$ | $Et_2OBF_3$ | $Et_2OBF_3$ | $Et_2OBF_3$ | $Et_2OBF_3$ | $Et_2OBF_3$ | $Et_2OBF_3$. |
| Vol. used, ml | 350 | 450 | 450 | 450 | 450 | 450 | 400 | 450 | 450. |
| Cat. on Feed, percent | 18.6 | 23.9 | 23.9 | 23.9 | 23.9 | 23.9 | 21.2 | 23.9 | 23.9. |
| Cat. Efficiency | 2.03 | .453 | .955 | .85 | .47 | 1.31 | 1.19 | 0.26 | 1.52. |
| Reaction: | | | | | | | | | |
| Time, Min | 385 | 420 | 400 | 385 | 370 | 360 | 125 | 240 | 430. |
| Temp., ° C | −16.5 to −15. | −26 to −25. | −15.5 to −16. | −15.5 to −13. | −15.5 to −12.5. | −15 to −12.5. | −12 to −10.5. | −17 to −13. | −12.5 to −9. |
| Recovery: | | | | | | | | | |
| Product, g | 788 | 226 | 476 | 423 | 232 | 657 | 530 | 128 | 757. |
| Yield, percent | 79 | 23 | 48 | 42 | 23 | 66 | 53 | 13 | 76. |
| Product: | | | | | | | | | |
| State | Fluid | Fluid | Fluid | Fluid | Fluid | Fluid | Soft, Rubbery. | Viscous | Viscous. |
| Color | Light | Very light | Very light | Very light | Light | Light | Light | Amber | Amber. |
| Iodine No. Cg. $I_2$/g | 260.8 | 267 | 273.3 | 257.9 | 257.6 | 273 | 359.4 | | |
| Percent C | 86.79 | 88.09 | 87.71 | 87.80 | 87.49 | 87.77 | 87.32 | | 89.07. |
| Percent H | 11.94 | 12.14 | 12.24 | 12.34 | 12.04 | 12.55 | 10.69 | | 10.26. |
| Staudinger Mol. Wt | 2,190 | 4,500 | 3,000 | 2,800 | 2,470 | 3,000 | | | |

The product obtained from each of the polymerizations reported in Table I was evaluated for film drying rate and chemical and mechanical resistances thereof. The data are reported in the following table:

*Table II.—Air dried and baked film properties[1] for butadiene-olefin fluid polymers*

| Run No. | Polymer[2] | Drying Rate, Hrs. | | | | | Properties of Films Air Dried 7 and 14 Days | | | | | | | | | | | | | Baked Films | | | | | |
|---|---|---|---|---|---|---|---|---|---|---|---|---|---|---|---|---|---|---|---|---|---|---|---|---|---|
| | | | | | | | H | | W | | G | | C | | F | | S | | T | | H | W | G | C | F | S | T |
| | | 1 | 2 | 4 | 6 | 24 | 7 | 14 | 7 | 14 | 7 | 14 | 7 | 14 | 7 | 14 | 7 | 14 | 7 | 14 | | | | | | | |
| 1 | $C_4H_6/iC_4H_8$ | 8 | 7 | 6 | 5 | 0 | 4 | 2 | 0 | 0 | 0 | 0 | 8 | 2 | 6 | 6 | 9 | 0 | 0 | 0 | 0 | 0 | 0 | 0 | 6 | 0 | 0 |
| 2 | $C_4H_6/C_3H_6$ | 6 | 5 | 0-1 | 0-1 | 0 | 4 | 2 | 0 | 0 | 0 | 0 | 5 | 2 | 6 | 6 | 3 | 0 | 0 | 5 | 1 | 0 | 0 | 6 | 3 | 0 |
| 3 | $C_4H_6/$1-Butene | 6-7 | 5 | 0 | 0 | 0 | 3 | 0 | 3 | 2 | 0 | 0 | 3 | 4 | 6 | 6 | 4 | 0 | 0 | 0 | 0 | 0 | 0 | 6 | 0 | 0 |
| 4 | $C_4H_6/$2-Butene | 6 | 4 | 0 | 0 | 0 | 3 | 2 | 0 | 0 | 0 | 0 | 4 | 3 | 6 | 6 | 4 | 4 | 2 | 0 | 0 | 0 | 0 | 0 | 6 | 0 | 0 |
| 5 | $C_4H_6/$Cyclohexane | 7 | 4 | 0 | 0 | 0 | 8 | 4 | --- | 0 | --- | 0 | --- | 0 | --- | 0 | 4 | 3 | --- | 0 | 0 | 0 | 0 | 0 | 6 | 0 | 0 |
| 6 | $C_4H_6/$Diisobutylene | 9 | 8 | 7 | 2 | 0 | 5 | 2 | 3 | 0 | 0 | 3 | 8 | 5 | 6 | 6 | 8 | 5 | 0 | 0 | 0 | 0 | 0 | 0 | 7 | 0 | 0 |
| 7 | $(C_4H_8)_n$ | 6 | 4 | 1 | 0 | 0 | 5 | 1 | 3 | 0 | 1 | 0 | 6 | 2 | 6 | 5-6 | 3 | 1 | 0 | 0 | 5 | 4 | 0 | 4 | 6 | 4 | 0 |
| 9 | $C_4H_6/$Styrene | 7 | 2 | 1 | 1 | 0 | [3]3 | --- | 0 | --- | 0 | 1 | 0 | --- | 6 | --- | 5 | --- | 0 | --- | 0 | 0 | 0 | 0 | 6 | 0 | 0 |

[1] See Table IV for key to evaluations.
[2] Diene/olefin ratio—75/25.
[3] Eight day evaluations.

The above data show that satisfactory air-dried and baked films can be prepared from the products obtained in accordance with the present invention.

EXAMPLE 2

Butadiene and isobutylene were copolymerized in accordance with Example 1 except that the diolefin/olefin ratio was varied. The results are reported in Table III.

EXAMPLE 4

A polymerization experiment was made in which sulfur dioxide was used as a solvent for the reactants and as a complexing agent for the aluminum chloride catalyst. The reaction charge consisted of 75 ml. of 1,3-butadiene and 25 ml. of isobutylene and 75 ml. of sulfur dioxide. The charge was refrigerated externally by liquid methyl chloride. To the charge was added an aluminum

Table III

| Run No | A | B | C | D |
|---|---|---|---|---|
| Feed Composition: | | | | |
| Butadiene, g | 750 | 325 | 275 | 1,000. |
| Isobutylene, g | 250 | 175 | 225 | 0. |
| Ratio diene/olefin | 75/25 | 65/35 | 55/45 | 100/0. |
| Diluent: | | | | |
| Type | MeCl | MeCl | MeCl | MeCl. |
| Volume, ml | 770 | 192 | 150 | 785. |
| Catalyst: | | | | |
| Type | $Et_2O:BF_3$ | $Et_2O:BF_3$ | $Et_2O:BF_3$ | $Et_2O:BF_3$. |
| Vol. used, ml | 350 | 500 | 500 | 400. |
| Cat. on feed, percent | 18.6 | 111 | 111 | 21.2. |
| Cat. efficiency | 2.03 | .382 | .42 | 1.19. |
| Reaction: | | | | |
| Time, Min | 385 | 325 | 305 | 125. |
| Temp. °C | −16.5 to −15 | −16 to −2 | −14 to −1.5 | −12 to −10.5. |
| Recovery: | | | | |
| Product, g | 788 | 212 | 233 | 530. |
| Yield, percent | 79 | 42 | 47 | 53. |
| Product: | | | | |
| State | Fluid | Liquid | Liquid | Soft, rubbery. |
| Color | Light | Light amber | Light amber | Light. |
| Iodine No. Cgs.$I_2$/g | 260.8 | 260.5 | 238.9 | 359.4. |
| Staudinger Mol. Wt | 2,190 | 940 | 770 | |

The products obtained by the above polymerization were evaluated for drying rates and resistance to chemical and mechanical action. The results are reported in Table IV and indicate the superior film properties of the polymer prepared from the feed of 75 parts of 1,3-butadiene and 25 parts of isobutylene.

chloride-ethyl chloride catalyst containing 3.52 g. of $AlCl_3$/100 ml. of solution. A total of 100 ml. of the catalyst solution was added in 10 ml. portions. The reaction mixture became cloudy after a short time after adding the catalyst, and upon standing, a precipitate settled to the bottom of the reactor. There was no evi-

Table IV

| Run No. | Polymer | Drying Rate, Hrs. | | | | | | Properties of Films Air Dried 7 and 14 Days | | | | | | | | | | | | | Baked Films | | | | | | |
|---|---|---|---|---|---|---|---|---|---|---|---|---|---|---|---|---|---|---|---|---|---|---|---|---|---|---|---|
| | | | | | | | | H | | W | | G | | C | | F | | S | | T | | | | | | | | |
| | | 1 | 2 | 4 | 6 | 24 | | 7 | 14 | 7 | 14 | 7 | 14 | 7 | 14 | 7 | 14 | 7 | 14 | 7 | 14 | H | W | G | C | F | S | T |
| A | Butadiene/Isobutylene, 75/25 | 8 | 7 | 6 | 5 | 0 | | 4 | 2 | 0 | 0 | 0 | 0 | 8 | 2 | 6 | 6 | 9 | 0 | 0 | 0 | 0 | 0 | 0 | 0 | 6 | 0 | 0 |
| B | Butadiene/Isobutylene, 63/35 | 9 | 9 | 9 | 8 | 0 | | 1 | 0 | 7 | 4 | 7 | 2 | 9 | 9 | 6 | 0 | 9 | 0 | 0 | 1 | 0 | 0 | 0 | 9 | 6 | 3 | 0 |
| C | Butadiene/Isobutylene, 55/45 | 9 | 9 | 9 | 9 | 8 | | 0 | 3 | 5 | 2 | 4 | 0 | 9 | 9 | 0 | 0 | 9 | 9 | 0 | 0 | 0 | 1 | 0 | 9 | 6 | 9 | 0 |
| D | Butadiene 100% | 6 | 4 | 1 | 0 | 0 | | 5 | 1 | 3 | 1 | 0 | 0 | 6 | 2 | 6 | 6 | 3 | 1 | 0 | 0 | 5 | 4 | 0 | 4 | 6 | 4 | 0 |

H=hardness; W=water resistance; G=grease resistance; C=caustic resistance; T=tack; F=flexibility; S=soap resistance.

*Key to evaluation ratings*

Drying Rate: 9—wet; 8—very sticky; 7—film just clings to finger; 6—set to touch; 3—decided tack but dust free; 0—tack free.
Flexibility (180° bent test): 0—unaffected; 1-4 hazed, very fine cracking; 7-9 heavy cracking and peeling.
Water, soap, grease and caustic resistances: 0—unaffected; 1-3 discolored or whitened and less adhesive; 4-6 softened and loss in adhesion; 7-9 pinholed or blistered to failure by removal of film.

EXAMPLE 3

An apparatus similar to that described in Example 2 was charged with the following:

| | |
|---|---|
| 1,3-butadiene | g__ 750 |
| Isobutylene | g__ 250 |
| Carbon tetrachloride | cc__ 50 |
| Methyl chloride | cc__ 720 |

To the above was added a boron trifluoride-ethyl ether complex catalyst. A total of 400 cc. of catalyst was added during the course of 2 hours and 28 minutes. At the end of 4 hours and 20 minutes the catalyst was quenched with equal parts of methanol and ammonium hydroxide (500 cc.). The reaction mixture was diluted with 500 cc. of n-heptane. Polymer was isolated as above (Example 3). Obtained 936 g. of a clear, and very light amber colored liquid. Conversion to polymer was 94%.

dence of any polymerization reaction after adding the above amount of catalyst. After one hour of contact, an aliquot sample was removed from the reactor, and the solvents stripped therefrom by heating on a steam plate. Upon treating the residue with water a very small amount of polymeric material was obtained. The reactants were allowed to contact overnight. On the following day, the amount of polymer was found to be small and about the same as was found previously.

EXAMPLE 5

The data of Example 4 show that aluminum chloride catalyst in the presence of a large excess of sulfur dioxide was incapable of promoting an extensive copolymerization of butadiene and isobutylene. In contrast, the following data indicate that a polymer can be obtained by contacting a mixture of butadiene and isobutylene with an aluminum chloride-sulfur dioxide complex catalyst in a mixed methyl chloride-ethyl chloride diluent.

A. PREPARATION OF CATALYST

A 5-liter 3-way flask, fitted with a mechanical stirrer and a Dry Ice-alcohol refrigerated reflux condenser, was charged with 2400 ml. of ethyl chloride and 266.7 g. of anhydrous, sublimed aluminum chloride. To this was then added 128 g. of liquid sulfur dioxide. The mixture was stirred for one hour and then filtered. All but one gram of the aluminum chloride dissolved. Catalyst concentration was 0.164 g. of $AlCl_3SO_2$/ml. of solution.

B. POLYMERIZATION

The equipment described under A was used for the polymerization experiment. The reactor was charged with 750 g. of 1,3-butadiene, 250 g. of isobutylene and 740 ml. of methyl chloride. The temperature of the mixture under reflux conditions was −16° C. The catalyst described above under A was added in 100 ml. portions over a period of 108 minutes. During this time, a total of 1000 ml. of catalyst solution was added. At the end of 135 minutes of contact time, the catalyst was quenched with 100 ml. each of methyl and isopropyl alcohols. The reaction mixture was diluted with 1000 ml. of naphtha. After weathering off the low boiling solvents, the polymer solution was separated from the catalyst residues, treated with clay and filtered. A 56 percent yield of dark amber colored product was obtained. The polymer gelled when an attempt was made to remove the solvents by distillation under vacuum.

EXAMPLE 6

A reactor as described under Example 5 was charged with 750 g. of 1,3-butadiene, 250 g. of isobutylene, 740 ml. of methyl chloride and 10 ml. of $SO_2$. To the above mixture was then delivered 1000 mls. of aluminum chloride-ethyl chloride catalyst containing 2.48 g. of aluminum chloride/100 ml. of solution. The catalyst solution was added in 100 ml. portions over a period of 76 minutes. After a reaction period of 83 minutes, the catalyst was quenched with methanol. The product was isolated by the same procedure described under Example 5. A 14 percent yield of a dark colored resin was obtained. The polymer softening point was 84° C. (Ball and Ring Method) and the iodine number was 142.6 c. g. s. $I_2$/g. In this case, the amount of aluminum chloride used corresponded to 73 percent of the theoretical amount required to react with the sulfur dioxide.

EXAMPLE 7

Example 6 was repeated except that 1.4 times the amount of catalyst was used. On this basis, the aluminum chloride to sulfur dioxide mole ratio was .260/.254. In this case, a 23 percent yield of dark colored, resinous product was obtained. Polymer softening point was 29.5° C. and the iodine number 150 c. g. s. $I_2$/g.

EXAMPLE 8

Equipment as described in Example 5 was charged with 750 g. of 1,3-butadiene, 250 g. of isobutylene, 740 ml. of methyl chloride and 5 ml. of sulfur dioxide. To the above was added over a period of 49 minutes, a total of 600 ml. of catalyst solution containing 3.28 g. aluminum chloride/100 ml. of ethyl chloride solution. During the addition of the catalyst, gel polymer was found to form within the catalyst delivery tube which was immersed in the reactants. After 70 minutes of contact time, the catalyst was quenched, and the product worked up as described under Example 5. There was obtained a 11% yield of dark colored, resinous product. The polymer softening point was 59° C. and the iodine number 168.5 c. g. s. $I_2$/g. In this instance, the aluminum chloride to sulfur dioxide mole ratio was 0.147/.127. Thus, the aluminum chloride was in excess.

EXAMPLE 9

Equipment as described in Example 5 was charged with 375 g. of 1,3-butadiene, 125 g. of isobutylene and 285 ml. of methyl chloride. To the above was then added, in increments, a total of 500 ml. of catalyst solution comprising the complex of 74 g. of ethyl ether and 133 g. of anhydrous, sublimed aluminum chloride dissolved in methyl and ethyl chlorides. The concentration of aluminum chloride being 20.24 g./100 ml. of solution. After a reaction period of 210 minutes, the catalyst was quenched with methanol. The product was worked up by the procedure given under Example 5-B. A 52 percent yield of a soft, amber colored product was obtained. The polymer iodine number was 232.7 c. g. s. $I_2$/g.

EXAMPLE 10

This example illustrates the use of a catalyst comprising gaseous $BF_3$ dissolved in ethyl chloride for the polymerization of 1,3-butadiene and isobutylene. Equipment as described in Example 5 was charged with 375 g. of 1,3-butadiene, 125 g. of isobutylene and 285 ml. of methyl chloride. To the above mixture, which showed an initial temperature of −15° C., was added, over a period of 178 minutes, 800 ml. of a catalyst solution consisting of gaseous $BF_3$ dissolved in ethyl chloride. A total of 125 ml. of the catalyst solution required 11.2 ml. of 0.451 N caustic for titration in the cold. The temperature of the reaction mixture after adding the catalyst was −4° C. After a period of 243 minutes, the catalyst was quenched with 100 ml. of equal portions of ammonium hydroxide and methanol. The low boiling solvents were allowed to weather off. The catalyst residues were removed from the product by water washing. The polymer solution, after being dried, was filtered to remove gel polymer. The solvents were removed from the polymer by distillation under vacuum. The distillation was discontinued at a bottoms temperature of 130° C. at 5 mmp. Hg. There were obtained a total of 339 g. of an amber colored, viscous, fluid polymer which showed an iodine number of 210.4 c. g. s. $I_2$/g.

EXAMPLE 11

Equipment as described in Example 5 was charged with 375 g. of butadiene, 125 g. of isobutylene and 1000 ml. of methyl chloride. Boron trifluoride gas was delivered under the surface of the reaction mixture in increments during a period of 26 minutes. During this time, the reaction mixture became yellow colored, viscous and foamy. Gel polymer appeared on the walls of the reactor. At the end of 29½ minutes, the catalyst was quenched with ammonia gas. The solution was passed through a screen to remove gel polymer. The product was isolated according to the procedure outlined in Example 10. Part of the product gelled during the solvent stripping operation. The weight of total product was 159 g. or 32 percent of the total feed. The polymer was rubbery and light colored.

EXAMPLE 12

Butadiene, 275 g., and isobutylene, 225 g., diluted with 500 ml. of methyl chloride were polymerized by means of gaseous boron trifluoride admitted beneath the surface of the charge. Gel polymer was formed and thrown out on the walls of the reactor. A 61 percent yield of a soft, amber colored polymer was obtained which showed an iodine number of 157.2.

EXAMPLE 13

A reactor was charged with 150 ml. of methyl chloride, 75 ml. of butadiene and 25 ml. of isobutylene. To this was added a small amount of $BF_3$-methanol catalyst, which was prepared by adding 1 mole of $BF_3$ gas to 1 mole of anhydrous methyl alcohol refrigerated by methyl chloride. A vigorous reaction took place with the formation of polymer. Upon adding additional catalyst the entire reaction mixture gelled.

EXAMPLE 14

Example 13 was repeated using less $BF_3$-methyl alcohol catalyst in order to avoid the formation of gel polymer. By quenching the catalyst just short of the incipient gel point, a soluble product was obtained which, when freed of solvents, was a resin.

The above data clearly show the remarkable superiority of the products obtained in accordance with the present invention when the butadiene content of the feed in the reaction charge is maintained at about 75% by weight and above. The films produced from the products obtained with lesser amounts of butadiene are still wet after air drying for 14 days while the films obtained from the products made in accordance with the present invention are tack-free after 24 hours. Furthermore, chemical resistances of the products prepared in accordance with the present invention are clearly superior.

The following conclusions are clearly evident from the above examples:

1. Products with satisfactory air-dried and baked films can be prepared by the use of the catalyst of this invention (Example 1).
2. Unsatisfactory films are obtained whenever the proportion of butadiene in the feed is less than 75% (Example 2).
3. Activators, such as carbon tetrachloride, increase the yield of polymer (Example 3).
4. The use of an $AlCl_3.SO_2$ catalyst in conjunction with a large excess of $SO_2$ resulted in an insignificant degree of polymerization (Example 4).
5. An aluminum chloride-sulfur dioxide complex prepared from molar proportions of reagents formed polymer (56% yield) which gelled upon stripping the solvents. (Example 5.) Thus, such complexes give low yields of polymer which exhibit a very low degree of thermal stability.
6. By adding aluminum chloride-ethyl chloride catalyst to a hydrocarbon charge containing varying amounts of sulfur dioxide, low yields of resinous polymers, of a relatively low degree of unsaturation, were produced. (Examples 6, 7, and 8.)
7. The use of an aluminum chloride-ethyl ether catalyst resulted in a low yield of soft, viscous polymer. (Example 9.)
8. By using an ethyl chloride solution of $BF_3$ as the catalyst, a polymer yield of 68% was obtained. Example 10.) Thus by using $BF_3$ gas dissolved in an alkyl halide, soluble polymer and some gel are produced. An obvious disadvantage of such a system is the difficulty associated with the recovery of the catalyst, and the formation of gel polymer.
9. By bubbling gaseous $BF_3$ into the polymerization charge, a part of the feed forms gel polymer. This method gives low yields of polymers which possess a low degree of thermal stability. (Example 11.) Gelation of a part of the feed also occurred even when the butadiene-olefin ratio was reduced to 55/45 parts. (Example 12.)
10. By using an excess of a $BF_3$-methyl alcohol catalyst the reaction charge gelled. (Example 13.) By controlling the amount of catalyst added, soluble product was produced. This product was resinous in nature. (Example 14.)

The nature of the present invention having been thus fully set forth and specific examples of the same given, what is claimed as new and useful and desired to be secured by Letters Patent is:

1. The process of preparing a drying oil which comprises contacting a mixture of 75 parts by weight of butadiene and 25 parts by weight of isobutylene in the presence of about 18.6 to 25 wt. percent of a complex of boron fluoride and ethyl ether in the mole ratio of 1.0:1.0 to 1.2:1.0, and in the presence of about 25 to 125 volume percent of a halo-alkane diluent, at a temperature of about $-15°$ C.

2. The process of preparing a drying oil which comprises contacting a mixture of 75 parts by weight of butadiene, 25 parts by weight of isobutylene, 72 parts by weight of methyl chloride, and 8 parts by weight of carbon tetrachloride, in the presence of 44.5 parts by weight of a boron-fluoride-ethyl-ether complex at a temperature of $-15°$ C.

3. The process of preparing a drying oil which comprises contacting a mixture of 75 parts by weight of butadiene, 25 parts by weight of isobutylene and about 77 parts by weight of methyl chloride, in the presence of about 39 parts by weight of a boron fluoride-ethyl ether complex at a temperature of about $-15°$ C.

4. A composition comprising essentially a drying oil copolymerization product of a mixture of about 75% by weight butadiene and 25% by weight of a substance selected from the group consisting of hydrocarbon monoolefins having 3 to 4 carbon atoms, said oil having an iodine number between about 230 and 280 $Cg.I_2/g.$ and a Staudinger molecular weight between about 2000 and 4500.

5. A composition as defined by claim 4 in which monoolefin is isobutylene.

6. A composition comprising essentially a drying oil copolymerization product of a mixture of about 75% by weight butadiene and about 25% by weight isobutylene, said oil having an iodine number between about 230 and 260 $Cg.I_2/g.$ and a Staudinger molecular weight of between about 2000 and 2500.

References Cited in the file of this patent

UNITED STATES PATENTS

| | | |
|---|---|---|
| 2,344,213 | Otto | Mar. 14, 1944 |
| 2,471,890 | Palmer et al. | May 31, 1949 |
| 2,513,558 | Geiser | July 4, 1950 |
| 2,521,431 | Walsh et al. | Sept. 5, 1950 |
| 2,548,415 | Welch et al. | Apr. 10, 1951 |
| 2,569,383 | Leyonmark et al. | Sept. 25, 1951 |
| 2,578,214 | West | Dec. 11, 1951 |
| 2,588,425 | Stevens et al. | Mar. 11, 1952 |
| 2,708,639 | Miller | May 17, 1955 |

FOREIGN PATENTS

| | | |
|---|---|---|
| 801,883 | France | Aug. 20, 1936 |